F. C. SMITH.
VALVE.
APPLICATION FILED NOV. 13, 1908.

931,155.

Patented Aug. 17, 1909.

WITNESSES:
R. Schlafli
Jack A. Schlin

INVENTOR
F. C. Smith,
BY John M. Sullman
ATTORNEY

UNITED STATES PATENT OFFICE.

FREDERICK C. SMITH, OF PORT NECHES, TEXAS.

VALVE.

No. 931,155.  Specification of Letters Patent.  Patented Aug. 17, 1909.

Application filed November 13, 1908. Serial No. 462,387.

*To all whom it may concern:*

Be it known that I, FREDERICK C. SMITH, citizen of the United States, residing at Port Neches, in the county of Jefferson and State of Texas, have invented certain new and useful Improvements in Valves, of which the following is a specification.

My invention relates to new and useful improvements in valves.

The object of my invention is to provide a valve which can be used with any fluid that is commonly handled in tankage.

Another object of my invention is to provide a valve which when properly adjusted will allow a fluid to pass through any one of its plurality of exits.

A further object of my invention is to provide in a device of the character described, a valve which will be simple, strong, durable, efficient and comparatively inexpensive to construct, also one in which its several parts will not be liable to get out of working order.

Figure 1:
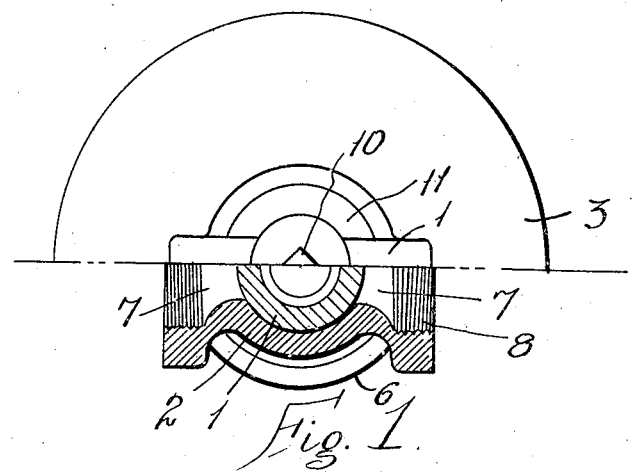
Figure 2:
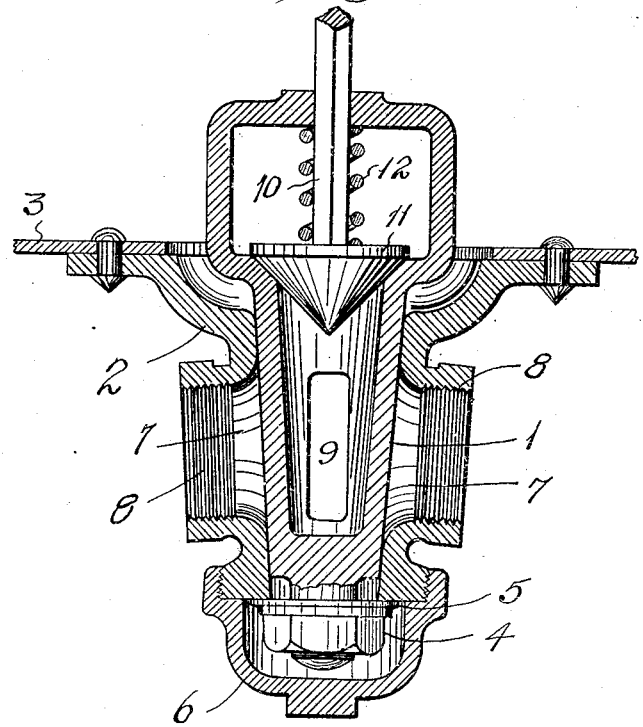

With the above and other objects in view, my invention has relation to certain novel features of construction and operation, an example of which is described in the following specification and illustrated in the accompanying drawings, wherein:

Figure 1 is a plan view shown partially in section, and Fig. 2 is a vertical cross sectional view of my invention.

In the drawings, the numeral 1 designates the casing of a distributing valve which is held in a body 2 supported below a tank shell 3 by a nut 4. A washer 5 is placed between the body 2 and the casing 1 to prevent the fluid from escaping while a cap 6 having internal threads is screwed on the body 2 below the nut 4 and will catch any fluid that might escape. Above this cap and below the level of the tank opening are ports 7 in the body 2 having a threaded portion 8 adapted to engage with threads on the distributing pipes.

Communication can be established with either of the outlets 7 by turning the casing 1 so that an opening 9 in the said casing is brought in alinement with either of the openings 7.

The casing 1 can be turned by a square valve stem 10 which passes through the casing and above the upper surface of the tank. At the lower end of this valve stem 10 a valve 11 is held by spring 12 against a valve seat formed in the casing 1. The valve 11 may be attached to the valve stem 10 by screw threads or in any other suitable manner. The openings in the upper part of said casing 1 are of sufficient size as to allow the insertion of the valve member into place.

It is obvious that when the stem 10 and the valve 11 are raised against the pressure of the spring 12 the fluid contained in the tank will enter the casing through an aperture in the upper portion of said casing 1 and then by turning the stem and the casing so that the opening 9 will be in direct alinement with one of the outlets 7 the fluid will be delivered therethrough.

What I claim, is:

In a device of the character described, the combination with a tank, of a hollow body having a plurality of lateral outlets, the interior of the body tapering toward the bottom and a flange upon its upper part adapted to be attached to said tank, of a revoluble hollow casing within said body, tapered to fit the interior thereof, provided with a lateral orifice, adapted to be brought into alinement with any one of said outlets by rotation and provided with an upper cage-like portion projecting into said tank, a cone-shaped valve closing communication between said casing and the tank interior, and positioned within said upper cage-like portion of the casing, a coiled spring normally holding said valve to its seat, and bearing against the top of said upper portion of the casing, a valve stem of square cross section, attached to said valve and passing through a square orifice in the top of said upper part of the casing, and a cap threaded upon the lower extremity of the body of the valve, to prevent leakage.

In testimony whereof I have signed my name to this specification in the presence of two subscribing witnesses.

FREDERICK C. SMITH.

Witnesses:
LELAN LEWIS,
FLYNN DAVIS.